United States Patent
Spies et al.

(10) Patent No.: US 9,499,652 B2
(45) Date of Patent: *Nov. 22, 2016

(54) POLYURETHANE-BASED POLYMER COMPOSITION

(71) Applicant: BASF SE, Ludwigshafen (DE)

(72) Inventors: Patrick Spies, Neustadt (DE); Frank Braun, Ludwigshafen (DE); Frank Prissok, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/778,931

(22) PCT Filed: Mar. 20, 2014

(86) PCT No.: PCT/EP2014/055635
§ 371 (c)(1),
(2) Date: Sep. 21, 2015

(87) PCT Pub. No.: WO2014/147194
PCT Pub. Date: Sep. 25, 2014

(65) Prior Publication Data
US 2016/0046751 A1 Feb. 18, 2016

(30) Foreign Application Priority Data
Mar. 20, 2013 (EP) .................... 13160144

(51) Int. Cl.
C08L 75/04 (2006.01)
C08G 18/04 (2006.01)
C08F 283/00 (2006.01)
C08K 3/00 (2006.01)
C08K 5/00 (2006.01)
C08K 5/02 (2006.01)

(52) U.S. Cl.
CPC ......... C08F 283/006 (2013.01); C08K 3/0058 (2013.01); C08K 5/0066 (2013.01); C08K 5/02 (2013.01); C08L 75/04 (2013.01)

(58) Field of Classification Search
None
See application file for complete search history.

(56) References Cited

U.S. PATENT DOCUMENTS

| 3,700,752 A * | 10/1972 | Hutchinson | C08F 283/006 521/127 |
|---|---|---|---|
| 3,970,725 A | 7/1976 | Tugukuni et al. | |
| 4,256,805 A | 3/1981 | Tugukuni et al. | |
| 2012/0329892 A1* | 12/2012 | Prissok | C08G 18/4854 521/60 |

FOREIGN PATENT DOCUMENTS

| DE | 2 003 365 A1 | 11/1970 | | |
|---|---|---|---|---|
| DE | 2 348 153 A1 | 4/1974 | | |
| JP | 55-80440 A | 6/1980 | | |
| JP | 2007-231068 A | 9/2007 | | |
| JP | 2007231068 A * | 9/2007 | | |
| WO | WO 2007/058736 A1 | 5/2007 | | |
| WO | WO 2007082838 A1 * | 7/2007 | ......... | C08G 18/4854 |
| WO | WO 2010/010010 A1 | 1/2010 | | |
| WO | WO 2010010010 A1 * | 1/2010 | ......... | C08G 18/4238 |

OTHER PUBLICATIONS

International Search Report issued May 9, 2014 in PCT/EP2014/055635.
International Preliminary Report on Patentability issued Jun. 17, 2015 in PCT/EP2014/055635 filed Mar. 20, 2014 (submitting English translation only).

* cited by examiner

*Primary Examiner* — Kara Boyle
(74) *Attorney, Agent, or Firm* — Oblon, McClelland, Maier & Neustadt, L.L.P.

(57) ABSTRACT

A polymer composition comprising at least one thermoplastic polyurethane (TPU) with a Vicat softening point (in accordance with ISO 306/A50) below 80° C. and from 5 to 95% by weight of at least one polymer obtainable via free-radical polymerization, based on the entirety of TPU and of the polymer obtainable via free-radical polymerization, where the polymer obtainable via free-radical polymerization has been bonded in the form of comb polymer, graft polymer, or copolymer to the TPU, is particularly suitable for injection-molding applications.

23 Claims, 2 Drawing Sheets

POLYURETHANE-BASED POLYMER COMPOSITION

The invention relates to a polymer composition, in particular for injection-molding applications, based on thermoplastic polyurethanes (TPUs), to a process for producing said composition, to moldings obtainable from the polymer composition, and also to use thereof in automobile construction, in shoe production, for sports and leisure applications, in agriculture, and in fishing.

Thermoplastic polyurethanes for injection-molding applications are known. They can be processed in conventional injection-molding, extrusion, and blow-molding plants and they feature by way of example excellent resilience, transparency, abrasion resistance, and chemical resistance. TPUs are therefore used in automobile construction, in shoe production, for sports and leisure applications, in agriculture, and in fishing.

For some applications it is desirable to mix TPU with other polymers, such as polystyrene, for example in order to matt the TPU, to improve surface properties for specific applications, or to stiffen the material. However, TPU has only limited miscibility with polystyrene and other polymers polymerized by a free-radical route. If the TPU-compounding process uses more than 15% by weight, delamination occurs during injection molding, leading to drastic impairment of the properties. The delamination is visible in a scanning electron microscope. FIG. 1 shows a SEM of a compounded material made of 60% by weight of polystyrene and 40% by weight of TPU (Elastollan® 1170A). The polystyrene appears dark in the image (contrasting with $RuO_4$).

It would therefore be desirable to find processes which can give TPU compositions with higher polystyrene content.

WO 2010/010010 describes thermoplastic polymer blends based on thermoplastic polyurethane and styrene polymer, foams produced therefrom, and associated production processes.

JP-A 1980-080440 describes a process for the production of a polymer composition where from 20 to 80% by weight of TPU elastomer particles and from 80 to 20% by weight of a styrene monomer or methacrylate ester are suspended in an aqueous medium and polymerized.

JP-A 2007-231068 discloses expandable styrene-modified TPU particles comprising 100 parts by weight of TPU and from 20 to 300 parts by weight of a styrene polymer, where the size of styrene polymer particles dispersed in the TPU is 0.5 µm or less.

Although good results have already been achieved with the known materials, there is much scope for improvements, for example in the resilience and transparency of materials of this type.

It was therefore an object to develop materials based on TPU which in particular at high polystyrene content retain resilience and transparency comparable with TPU.

It has been found that polymers made of TPU and of a polymer obtainable via free-radical polymerization can be produced with the desired advantageous properties if the TPU used has a Vicat softening point below 80° C. (in accordance with ISO 306/A50), and the polymer obtainable via free-radical polymerization has been bonded in the form of comb polymer, graft polymer, or copolymer to the TPU.

Figure 1:
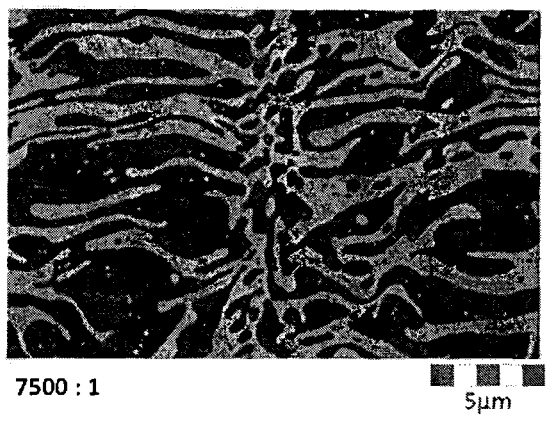
FIG. 1 shows a SEM image of compounded material made of 60% by weight of polystyrene and 40% by weight of TPU (Elastollan® 1170A).

The invention therefore provides a polymer composition, in particular for injection-molding applications, comprising at least one thermoplastic polyurethane (TPU) with a Vicat softening point (in accordance with ISO 306/A50) below 80° C. and from 5 to 95% by weight of at least one polymer obtainable via free-radical polymerization, based on the entirety of TPU and of the polymer obtainable via free-radical polymerization, where the polymer obtainable via free-radical polymerization has been bonded in the form of comb polymer, graft polymer, or copolymer to the TPU.

The invention also provides a molding obtainable via injection molding of a polymer composition of the invention, and also use of said molding as cable insulation, and also as material for the production of drag cables, of pneumatic hoses, of spiral hoses, of toothed belts, of conveying hoses, and of hydraulic hoses (outer covers).

The invention further provides a process for producing the polymer composition of the invention, comprising the following steps:

a) dispersion of one or more TPUs with a Vicat softening point below 80° C., from 5 to 95% by weight of one or more monomers polymerizable by a free-radical route and optionally comonomers, based on the entirety of TPU and of the monomers mentioned, of a polymerization initiator, of a dispersing agent, and optionally of other additional substances and/or polymerization aids in an aqueous medium at a temperature at which no substantial polymerization of the free-radically polymerizable monomers takes place;

b) optionally stirring of the resultant dispersion for from one to 24 h at a temperature at which no substantial polymerization of the free-radically polymerizable monomers takes place, and c) polymerization of the free-radically polymerizable monomers in the form of a comb polymer, graft polymer, or copolymer, onto the TPU.

The invention also provides a process for producing of a polymer composition, in particular for injection-molding applications, comprising the following steps:

a) dissolution of one or more TPUs with a Vicat softening point below 80° C. and optionally of other additional substances and/or polymerization aids in a solvent suitable for TPU, preferably THF or dioxane;

b) heating of the solution to a temperature at which the polymerization of the monomers introduced into step c) takes place, and c) introduction of from 5 to 95% by weight of one or more monomers polymerizable by a free-radical route (based on the entirety of TPU and of the monomer(s) polymerizable by a free-radical route) and of one or more polymerization initiators.

Thermoplastic polyurethanes (TPUs) and processes for production thereof are known.

The invention uses types of TPU with a Vicat softening point below 80° C., preferably from 60 to 79° C., particularly preferably from 60 to 75° C. As can be seen by someone skilled in the art, the Vicat temperature refers to the TPU, and not to the combination of TPU and polymer.

The Vicat softening point is determined here in accordance with DIN EN ISO 306 by method A50, i.e. with a force of 10 N and a heating rate of 50° C./h.

A Vicat softening point of the invention can be achieved by methods known to the person skilled in the art, for example via use of appropriate monomer units during the production of the TPU (see below).

The Shore hardness A of TPU grades used in the invention is preferably in the range from 50 to 100, particularly preferably from 65 to 85 (measured in accordance with DIN 53505).

The melting range (glass transition) is preferably in the range from −20° C. to −60° C. It is measured preferably by differential scanning colorimetry (DSC), in particular with a heating rate of 10° C./min, for example in accordance with ISO 11357/-1/-2.

Tensile strain at break in accordance with DIN 53504-S2 is preferably >550%.

Another feature essential to the invention, alongside the stated Vicat softening point, is that TPUs used in the invention must comprise functional groups which form, under the typical conditions of free-radical polymerization of by way of example styrene (T=from 100 to 140° C.; from 0.1 to 3% by weight of peroxide initiator, such as dicumyl peroxide), a comb polymer, graft polymer, or copolymer with the monomers polymerizable by a free-radical route. In a first variant, this is achieved by using, during the production of the TPUs, in a manner known in principle (see below), a di- or monoisocyanate component having hydrogen atoms that can be detached by a free-radical route, an example being diphenylmethane 4,4'-, 2,4'-, and/or 2,2'-diisocyanate (MDI), or else a mixture of these.

In a second variant, monomers polymerizable by a free-radical route and having groups (alcohol groups, epoxy groups, amine groups) that can enter into a polyaddition reaction with isocyanates are added during the production of the TPUs in a known manner (see below). Preferred monomers here are in particular the following compounds: hydroxyethyl methacrylate; 1,2- and 1,3-dihydroxypropyl methacrylate; glycidyl methacrylate, ortho-, meta-, and para-hydroxystyrene, meta- and para-aminostyrene, methacrylamide, 1,4-butenediol, 1,4-butynediol, and/or polybutadienediol.

TPUs and processes for production thereof have been widely described, for example in Gerhard W. Becker and Dietrich Braun, Kunststoff Handbuch [Plastics handbook], volume 7 "Polyurethanes", Carl Hanser Verlag, Munich, Vienna 1993.

All of the molar masses mentioned in this specification, stated in [kg/mol], are the number-average molar mass.

In preferred embodiments, TPU is produced via reaction from a mixture of isocyanates (a) with compounds (b) reactive toward isocyanates, preferably with a molar mass of from 0.5 kg/mol to 10 kg/mol, and optionally with chain extenders (c), preferably with a molar mass of from 0.05 kg/mol to 0.5 kg/mol.

In other preferred embodiments, at least one chain regulator (c1), one catalyst (d), and optionally at least one filler, auxiliary, and/or additive are further added to the mixture for the production of TPU. The groups of substances designated by the lower-case letters, in some cases with an added numeral, are also termed components.

Components (a), (b), (c), (c1), (d), and (e) usually used during the production of the TPUs are described by way of example below, and comprise the following groups of substances: isocyanates (a), compounds (b) reactive toward isocyanates, chain extenders (c), chain regulators (c1), catalysts (d) and/or at least one conventional filler, auxiliary, and/or additive.

Production of TPUs always requires a mixture of isocyanates (a) and compounds (b) reactive toward isocyanates. The further addition of components (c), (c1), (d), and (e) is optional and can involve individual components or any possible variation thereof. The term component here in each case means an individual substance or a mixture of the substances covered by said component.

The term structural component is used for the following components: isocyanates (a), compounds (b) reactive toward isocyanates, and chain extenders (c) and, to the extent that they are used, also the chain regulators (c1).

In preferred embodiments, organic isocyanates (a) used comprise aliphatic, cycloaliphatic, araliphatic, and/or aromatic isocyanates, and more preferably diisocyanates. Examples of preferred diisocyanates are tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'-, and 2,2'-diisocyanate, diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and phenylene diisocyanate.

Particular preference is given to diphenylmethane 4,4'-, 2,4'-, and 2,2'-diisocyanate (MDI), and also to mixtures of these. Subordinate amounts, e.g. amounts of up to 3 mol %, preferably of up to 1 mol %, based on the organic diisocyanate, of a polyisocyanate of functionality three or higher can optionally replace the organic diisocyanates, but the amount of this replacement must be restricted so that polyurethanes obtained are still thermoplastically processable. A relatively large amount of these more than difunctional isocyanates is advantageously compensated by concomitant use of less than difunctional compounds having reactive hydrogen atoms, in order to avoid any excessive chemical crosslinking of the polyurethane.

In preferred embodiments, compounds (b) used that are reactive toward isocyanates are polyetherols, polyesterols, and/or polycarbonatediols, a collective term usually used for these being "polyols".

TPU is preferably produced from polyether alcohol, and it is particularly preferable to use polyetherdiol.

Suitable polyetherdiols can be produced by known processes, for example via anionic polymerization of alkylene oxides with alkali metal hydroxides, such as sodium hydroxide or potassium hydroxide, or with alkali metal alcoholates, such as sodium methoxide, sodium ethoxide, or potassium ethoxide, or potassium isopropoxide, as catalysts, and with addition of at least one starter molecule which comprises from 2 to 3, preferably 2, reactive hydrogen atoms in bonded form, or via cationic polymerization with Lewis acids as catalysts from one or more alkylene oxides having from 2 to 4 carbon atoms in the alkylene moiety. Examples of suitable alkylene oxides are tetrahydrofuran, propylene 1,3-oxide, and particularly preferably ethylene oxide and propylene 1,2-oxide. The alkylene oxides can be used individually, in alternating succession, or in the form of mixtures. Examples of starter molecules that can be used are: water, organic dicarboxylic acids, such as succinic acid and adipic acid, and preferably dihydric alcohols optionally comprising ether bridges in bonded form, e.g. ethanediol, 1,2-propanediol, 1,4-butanediol, diethylene glycol, 1,6-hexanediol, and 2-methyl-1,5-pentanediol. The starter molecules can be used individually or in the form of mixtures. The polytetrahydrofurans (PTHFs) comprising hydroxy groups are in particular suitable and preferred.

The average molecular weights of the polyetherols, where these are in essence linear, are usually from 500 to 8000, preferably from 600 to 6000, and the preferred average molecular weight of the PTHF here is from 500 to 2500, in particular from 800 to 2000. The materials here can be used either individually or else in the form of mixtures with one another.

A particularly preferred polyetherdiol is polytetrahydrofuran. It is preferable that the molar masses of the polyether alcohols and polytetrahydrofuran used are from 0.6 kg/mol to 2.5 kg/mol. The polyether alcohols are used individually or else in the form of a mixture of various polyether alcohols.

In alternative embodiments, TPU is produced from polyester alcohol. In one preferred embodiment, polyesterdiol is used for this purpose. A preferred polyesterdiol is produced from adipic acid and 1,4-butanediol. Preferred embodiments of the polyester alcohols have a molar mass of from 0.6 kg/mol to 2.5 kg/mol.

In embodiments to which further preference is given, said polyols have molar masses of from 0.5 kg/mol to 8 kg/mol, preferably from 0.6 kg/mol to 6 kg/mol, in particular from 0.8 kg/mol to 4 kg/mol, and in embodiments to which further preference is given they have an average functionality of from 1.8 to 2.3, more preferably from 1.9 to 2.2, in particular 2. In one particularly preferred embodiment, the polyol is a polyester alcohol, preferably synthesized from polytetrahydrofuran, and in an embodiment to which further preference is given its molar mass is from 0.6 kg/mol to 2.5 kg/mol.

In preferred embodiments, chain extenders (c) used comprise aliphatic, araliphatic, aromatic and/or cycloaliphatic compounds, and in embodiments to which further preference is given the molar mass of these is from 0.05 kg/mol to 0.5 kg/mol. In some preferred embodiments, chain extenders (c) are compounds having two functional groups, for example diamines and/or alkanediols having from 2 to 10 carbon atoms in the alkylene moiety, in particular 1,4-butanediol, 1,6-hexanediol, and/or di-, tri-, tetra-, penta-, hexa-, hepta-, octa-, nona-, and/or decaalkylene glycols having from 3 to 8 carbon atoms, and corresponding oligo- and/or polypropylene glycols. In other embodiments, mixtures of the chain extenders are used for the production of TPU.

In some embodiments, chain regulators (c1) are used, usually with a molar mass of from 0.03 kg/mol to 0.5 kg/mol. Chain regulators are compounds which have only one functional group with regard to isocyanates. Examples of chain regulators are monohydric alcohols, monofunctional amines, preferably methylamine, and/or monohydric polyols. Chain regulators can be used for controlled adjustment of the flow behavior of the mixtures of the individual components. In preferred embodiments, the amount used of chain regulators is from 0 parts by weight to 5 parts by weight, more preferably from 0.1 part by weight to 1 part by weight, based on 100 parts by weight of the compound b) reactive toward isocyanates. Chain regulators are used to supplement chain extenders or in place thereof.

In other embodiments, the TPU production process uses at least one catalyst (d) which in particular accelerates the reaction between the NCO groups of the diisocyanates (a) and the compounds reactive toward isocyanates, preferably hydroxy groups of structural components (b), (c), and (c1). In preferred embodiments, the catalyst is one selected from the group of the tertiary amines, such as triethylamine, dimethylcyclohexylamine, N-methylmorpholine, N,N'-dimethylpiperazine, 2-(dimethylaminoethoxy)ethanol, diazabicyclo[2.2.2]octane, and similar substances. In embodiments to which further preference is given, the at least one catalyst is one selected from the group of the organometallic compounds and by way of example is titanic ester, an iron compound, such as iron(III) acetylacetonate, a tin compound, such as tin diacetate, tin dioctanoate, tin dilaurate, or a dialkyltin salt of an aliphatic carboxylic acid, e.g. dibutyltin diacetate, dibutyltin dilaurate, or the like.

In some embodiments, the catalysts are used individually, and in other embodiments mixtures of catalysts are used. In preferred embodiments, the amounts used of the catalyst or of the mixture of catalysts are from 0.0001 part by weight to 0.1 part by weight per 100 parts by weight of the compound (b) reactive toward isocyanates, preferably polyhydroxy compound.

Examples that may be mentioned of auxiliary and/or additive (e) are hydrolysis stabilizers and flame retardants. Other additives and auxiliaries can be found in standard works, such as the Becker and Braun (1996) work mentioned above.

Other substances that can be added to structural components (a) to (c), and optionally (c1), alongside catalysts (d), or else without the use of catalysts, are hydrolysis stabilizers, such as polymeric and low-molecular-weight carbodiimides.

The molar ratios of structural components (b) and (c) can be varied relatively widely in order to adjust the Shore hardness of TPU. In preferred embodiments, the molar ratio of component (b) to the entire amount of chain extenders (c) used is from 10:1 to 1:10, preferably from 5:1 to 1:8, more preferably from 1:1 to 1:4, where the hardness of TPU rises with increasing content of chain extender (c). This method permits adjustment to Shore hardness values of from A44 to D80, particularly preferred Shore hardness values being from A44 to A84. The Shore hardness values are determined in accordance with DIN 53505.

In embodiments to which further preference is given, the reaction to give TPU takes place with customary indices. The index is defined via the ratio of the entirety of isocyanate groups used during the reaction in component (a) to the groups reactive toward isocyanates, i.e. the active hydrogen atoms, in components (b) and (c). If the index is 100, there is one active hydrogen atom, i.e. one function reactive toward isocyanates, in components (b) and (c) for each isocyanate group in component (a). If indices are above 100, there are more isocyanate groups present than groups reactive toward isocyanates, for example OH groups.

In particularly preferred embodiments, the reaction to give TPU takes place with an index of from 60 to 120, more preferably with an index of from 80 to 110.

The production of TPU is preferably carried out by one of the known processes addressed below. Preferred embodiments are the continuous process, for example using reaction extruders, the belt process, the "one-shot" process, or the prepolymer process. The batch process and the prepolymer process are embodiments to which preference is equally given. In these processes, reactive components (a) and (b), and also optionally (c), (c1), (d), and/or (e) can be mixed with one another in succession or simultaneously, whereupon the reaction of components (a) and (b) immediately begins.

In the extruder process, structural components (a) and (b), and also optionally components (c), (c1), (d), and/or (e) are introduced individually or in the form of a mixture into the extruder and by way of example are reacted at temperatures of from 100° C. to 280° C., preferably from 140° C. to 250° C. The resultant TPU is extruded, cooled, and pelletized. It can sometimes be advantageous to condition the resultant TPU prior to further processing at from 80° C. to 120° C., preferably at from 100° C. to 110° C., for a period of from 1 to 24 hours, i.e. to permit the mixture to continue reacting at constant temperature.

Preferred types of TPU have a relatively large content of the soft phase in comparison with the hard phase, preferred amounts of soft phase being from 5 to 30% by weight, particularly preferably from 10 to 25% by weight. It is moreover preferable that the nitrogen content of the hard phase is relatively high.

Examples of preferred types of TPU are available commercially as Elastollan®1170 AU, Elastollan®1180, Elastollan®1175 A 10W000, and Elastollan®880 A 13N000 from BASF Polyurethan GmbH, Lemförde, Germany.

Particular preference is given to Elastollan®1170 AU, a TPU that is obtainable from Polytetrahydrofuran 1000 and 2000 (where the numerals relate to the molecular weight $M_w$, and the products are by way of example available commercially from BASF SE), and from a small proportion of 1,4-butanediol and diphenylmethane 4,4'-diisocyanate (MDI).

The polymer compositions of the invention comprise, alongside the TPU, from 5 to 95% by weight (based on the entirety of TPU and styrene polymers) of one or more polymers obtainable via free-radical polymerization and bonded in the form of comb polymer, graft polymer, or copolymer to the TPU. It is preferable that the proportion of these is from 80 to 30%, particularly preferably from 75 to 50%, very particularly preferably from 75 to 65%.

Preferred polymers obtainable via free-radical polymerization used are polymers based on monomers having vinylic unsaturation, for example (and preferably) styrene, acrylates, and methacrylates, vinyl chloride, vinyl acetate, acrylonitrile, and mixtures thereof.

Styrene polymers are preferred.

The expression styrene polymer in the invention comprises polymers based on styrene, or alpha-methylstyrene, or on a mixture of styrene and alpha-methylstyrene. Styrene polymers of the invention are based on at least 50% by weight of styrene and/or alpha-methylstyrene monomers.

Preferred styrene polymers are polystyrene, poly-alpha-methylstyrene, and styrene-alpha-methylstyrene copolymers, and others that can be used are styrene-butadiene copolymers (SB), styrene-acrylonitrile copolymers (SAN), acrylonitrile-alpha-methylstyrene copolymers (AMSAN), styrene-maleic anhydride copolymers (SMA), styrene-methyl methacrylate copolymers (SMMA), styrene-N-phenylmaleimide copolymers (SPMI), acrylonitrile-styrene-acrylate (ASA), methyl methacrylate-butadiene-styrene (MBS), and methyl methacrylate-acrylonitrile-butadiene-styrene (MABS) polymers, and mixtures thereof. Particular preference is given to polystyrene, i.e. the use of styrene monomers.

Figure 2:
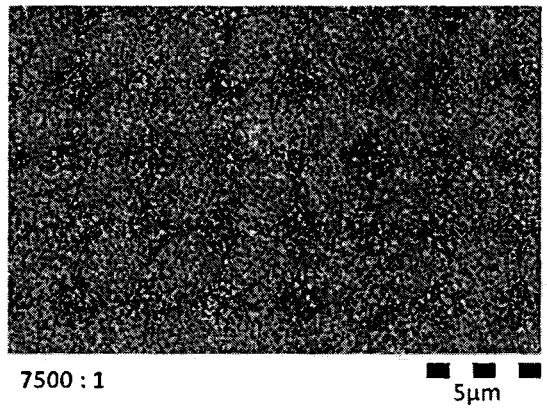
FIG. 2 shows a SEM image of the phase morphology of a polymer made from 40% by weight of TPU and of 60% by weight of polystyrene.

The polymer compositions of the invention feature a particular TPU phase morphology, which is composed of a continuous phase made of TPU homopolymer and of a discontinuous phase made of the graft polymer of TPU and of the polymer obtainable via free-radical polymerization. The TPU phase here ideally has a phase morphology as shown in FIG. 2 (SEM). The graft polymer made of TPU and of the polymer obtainable via free-radical polymerization here forms round to elliptical discontinuous phases with a diameter of from 50 to 500 nm. Surrounding these there is a coherent continuous TPU network. FIG. 2 is the SEM of a polymer made of 40% by weight of TPU and 60% by weight of polystyrene. $RuO_4$ was used for contrasting of the polystyrene phase with respect to the TPU phase.

An essential element of the invention is that the polymer structure described above can be obtained via free-radical polymerization of one or more monomers in the TPU network swollen by said monomer(s), or can be obtained, under suitable conditions, in a solvent into which TPU has been dissolved.

As compositions for injection molding applications, preferably in accordance with the invention, the compositions of the invention are not expandable polymer particles.

The polymer compositions of the invention can also be used in the form of blends with other polymers. The production methods for blends of this type are known to the person skilled in the art.

The polymer compositions of the invention preferably comprise an additive component, alongside the polymer component. Suitable additives are known to the person skilled in the art.

In one preferred embodiment, at least one filler is added to the polymer composition. Examples of fillers that can be used in amounts which are generally from 0.1 to 10% by weight, preferably from 0.1 to 3% by weight, particularly preferably from 0.1 to 1.5% by weight, based on the polymer composition, are fine-particle, inorganic solids, such as talc powder, silicon dioxide, mica, clay, zeolites, calcium carbonate, titanium dioxide, aluminum powder, and/or mineral fillers, such as glass fibers.

If desired, it is possible to add other additives, such as plasticizers, flame retardants, carbon black for coloring, soluble and insoluble dyes, pigments, UV stabilizers, and/or heat stabilizers.

The use of UV stabilizers has proven advantageous. Specifically in the case of polymers such as SMA, strong UV irradiation leads to visible yellowing and to chemical changes in the material which are attended by significant embrittlement. Reactivity plays a decisive part in the selection of suitable UV stabilizers. While stabilizers based on benzotriazoles, e.g. Tinuvin 234, can improve UV resistance without altering processing properties, stabilizers based on sterically hindered amines, e.g. Uvinul 4050 and Tinuvin 770, are less suitable for the polymer compositions of the invention.

The pellets of the invention preferably comprise, as additive, a UV stabilizer based on benzotriazoles in amounts in the range from 0.05 to 5 parts by weight, preferably from 0.1 to 1 part by weight, based on 100 parts by weight of polymer.

Because various industries apply fire-protection regulations, it is preferable to add one or more flame retardants. Examples of suitable flame retardants are tetrabromobisphenol A, brominated polystyrene oligomers, brominated butadiene-polystyrene copolymers in accordance with WO 2007/058736, tetrabromobisphenol A diallyl ether, and hexabromocyclododecane (HBCD), in particular the industrial products, where these in essence comprise the α-, β-, and γ-isomer with added synergists, such as dicumyl. Preference is given to brominated aromatics, such as tetrabromobisphenol A, and to brominated styrene oligomers.

Examples of suitable halogen-free flame retardants are expandable graphite, red phosphorus, and phosphorus compounds, such as triphenyl phosphate and 9,10-dihydro-9-oxa-10-phosphaphenanthrene 10-oxide.

Preferred phosphorus compounds are tris(2-chloroisopropyl) phosphate, triethyl phosphate, diethyl ethylphosphonate, cresyl diphenyl phosphate, Exolit OP560, diphenyl 6-(diphenoxyphosphoryloxy)hexahydrofuro[3,2-b]furan-3-yl phosphate, 9,10-dihydro-9-oxa-10-phosphaphenanthrene 10-oxide, and 6H-dibenzo[c,e][1,2]oxaphosphorine 6-oxide.

Preference is moreover given to organic peroxides (dicumyl peroxide), sulfur, and disulfides as synergists. The abovementioned flame retardants can either be dissolved in the monomers before the polymerization reaction starts or incorporated in the TPU by extrusion.

The total amount of additives is generally from 0 to 5% by weight, preferably from 0 to 0.5% by weight, based on the total weight of the polymers used.

The polymer compositions of the invention can be obtained via a production process comprising the following steps:

a) dispersion of one or more TPUs with a Vicat softening point below 80° C., from 5 to 95% by weight of one or more monomers polymerizable by a free-radical route and optionally comonomers, based on the entirety of TPU and of the monomers mentioned, of a polymerization initiator, of a dispersing agent, and optionally of other additional substances and/or polymerization aids in an aqueous medium at a temperature at which no substantial polymerization of the free-radically polymerizable monomers takes place;

b) optionally stirring of the resultant dispersion for from one to 24 h at a temperature at which no substantial polymerization of the free-radically polymerizable monomers takes place, and c) polymerization of the free-radically polymerizable monomers in the form of a comb polymer, graft polymer, or copolymer, onto the TPU.

Preferably the process consists of steps a) to c).

In the suspension polymerization reaction of the invention, it is preferable to use styrene alone, in accordance with what has been said above. As an alternative it is also possible to use other monomers polymerizable by a free-radical route, e.g. alkylstyrenes, divinylbenzene, 1,4-butanediol dimethacrylate, acrylonitrile, diphenyl ether, or α-methylstyrene, and acrylates.

The usual auxiliaries, such as peroxide initiators, suspension stabilizers, chain-transfer agents, and plasticizers can be added during the suspension polymerization reaction.

Amounts of from 3 to 15% by weight, based on the entirety of monomer and TPU, of the auxiliaries and additives mentioned can moreover be added to the suspension. They can be added to the suspension prior to, during, or after polymerization of.

It is advantageous to use, as suspension stabilizers, inorganic Pickering dispersants, for example magnesium pyrophosphate or calcium phosphate.

Before the TPU used is used in the polymerization it can be processed via underwater pelletization to give mini pellets of average diameter from 0.5 to 1.5 mm. The product obtained after the polymerization reaction therefore has a particle size that can be processed in conventional EPS machines. Amounts of from 0.01 to 15% by weight of nucleating agents, such as talc powder or polyethylene waxes, can moreover be incorporated by means of extrusion into the polyurethane used.

One preferred embodiment of the process begins by using, as initial charge, an aqueous phase which comprises from 0.1 to 10% by weight of the abovementioned Pickering stabilizers, from 0.1 to 0.001% by weight of a surfactant (for example sodium dodecylsulfonate), and from 1 to 90% by weight of TPU pellets in a stirrable pressure autoclave.

The monomer, which optionally comprises the abovementioned auxiliaries, such as initiators and flame retardants, is metered at room temperature, or below the polymerization temperature, into the stirred reactor. One variation of the process begins by combining the TPU at room temperature with the monomer, which comprises the abovementioned auxiliaries, such as initiators and optionally flame retardants, in the absence of water, and allowing the material to swell for from 0.5 to 24 hours. The pellets swollen by monomer are then likewise transferred to the polymerization reactor, which contains the aqueous phase with the abovementioned Pickering stabilizer and with the surfactant.

It has proven advantageous to stir the reaction mixture for a certain time (about 1 to 5 hours) at an elevated temperature below the polymerization temperature (preferably from 10 to 60° C., for example at 50° C.), in order to promote swelling of the TPU pellets by the monomer mixture. The reaction mixture is then heated to the polymerization temperature. Surprisingly, it has been found that increased formation of the copolymer described above, made of TPU and polystyrene, occurs at a preferred polymerization temperature of from 110 to 140° C. (use of a peroxide initiator with T½=1 h at from 120 to 135° C.).

The suspension polymerization reaction produces particles which are bead-shaped and in essence round, with average diameter in the range from 0.5 to 4 mm if micropelletized TPU has been used, or particles of size from 0.5 to 2 cm if no micropelletization of the TPU has been carried out. They can be coated with the usual coating compositions, for example fine-particle silicates. It has proven particularly useful here to coat the polymer with from 0.1 to 1% by weight of hydrophilic silica (Sipernat® FK320; Evonic).

The invention further provides a process for producing a polymer composition, in particular for injection-molding applications, comprising the following steps:

a) dissolution of one or more TPUs with a Vicat softening point below 80° C. and optionally of other additional substances and/or polymerization aids in a solvent;

b) heating of the solution to a temperature at which the polymerization of the monomers introduced into step c) takes place, and c) introduction of from 5 to 95% by weight of one or more monomers polymerizable by a free-radical route (based on the entirety of TPU and of the monomer(s) polymerizable by a free-radical route) and of one or more polymerization initiators.

Preferably the process consists of steps a) to c).

In the solution polymerization reaction of the invention, it is preferable to use styrene alone, in accordance with what has been said above. As an alternative it is also possible to use other monomers polymerizable by a free-radical route, e.g. alkylstyrenes, divinylbenzene, 1,4-butanediol dimethacrylate, acrylonitrile, diphenyl ether, or α-methylstyrene, and acrylates.

Examples of suitable solvents are cyclic ethers, preferably THF and dioxane, particular preference being given to dioxane.

The usual auxiliaries, such as peroxide initiators, chain-transfer agents, and plasticizers can be added during the solution polymerization reaction.

Amounts of from 3 to 15% by weight, based on the entirety of monomer and TPU, of the auxiliaries and additives mentioned can moreover be added to the solution. They can be added to the solution prior to, during, or after polymerization reaction.

One preferred embodiment of the process begins by using, as initial charge in a stirrable pressure autoclave, TPU dissolved in the solvent (for example dioxane or THF). The mixture is then heated to a temperature (preferably from 95 to 130° C.) at which the monomers polymerizable by a free-radical route undergo polymerization. A solution of the polymerization initiator (preferably dibenzoyl peroxide or dicumyl peroxide) in the monomer polymerizable by a free-radical route (preferably styrene) is then slowly metered continuously into the mixture. After a number of hours of continued stirring, a relatively small amount of polymerization initiator is again metered into the mixture, and stirring is again continued for a number of hours. The polymer composition of the invention can be isolated via removal of the solvent.

The polymer compositions produced via solution polymerization exhibit an even finer phase distribution between TPU homopolymer and TPU graft polymer after processing by the injection-molding process.

The polymer composition of the invention is particularly suitable for the production of moldings via injection molding. Moldings of the invention are suitable not only for the abovementioned applications but also by way of example for applications in automobile construction, in shoe production, in the sports and leisure sector, in agriculture, and in fishing.

The examples provide further explanation of the invention.

EXAMPLES

Precipitated Magnesium Pyrophosphate (MPP)

Inventive examples 1 to 4 used an amorphous precipitated MPP as Pickering stabilizer. It is of decisive importance that the precipitated MPP used has been freshly prepared (at most 12 hours old), since otherwise it is impossible to achieve adequate stabilization of the reaction mixtures. The precipitated MPP can be produced as follows:

931.8 g of sodium pyrophosphate (Giulini) are dissolved in 32 l of water at room temperature (25° C.). A solution of 1728 g of magnesium sulfate heptahydrate (Epsom salt) is added to this solution, with stirring, and stirring is then continued for a further 5 minutes. This gives a white suspension, which settles after a few minutes. The abovementioned suspension is used directly in the examples described after brief stirring/shaking.

TPU Pellets:

Commercially available polyether-based TPU (Elastollan® 1170AU, Elastollan® 1180A) from BASF Polyurethanes GmbH is used. It has proven advantageous to use an extruder and underwater pelletizer to convert the TPU to micropellets of particle size from 0.5 to 2 mm, so as to facilitate operation in the polymerization reactor during the suspension polymerization reaction, and during the swelling procedure.

Inventive Example 1

Production of TPU Polystyrene 60:40 Copolymer 480 g of styrene, 3.4 g of dicumyl peroxide, and 720 g of Elastollan 1170AU micropellets were charged to a 2 l polyethylene bottle, and were kept in motion for 2 h on a roller table for swelling purposes.

The swollen TPU was transferred to a 6 l pressure autoclave [EPS reactor, maximum pressure: 20 bar, blade stirrer (stirrer rotation rate 300 rpm)] containing 3 kg of deionized water, 803 g of precipitated MPP, and 42 g of 2% solution of E30 emulsifier (produced from E30-40 from Leuna Tenside GmbH). Once the reactor had been sealed and inertized with nitrogen, the following temperature program was initiated:

0.5 hour of heating from 20° C. to 50° C.
temperature of 50° C. maintained for 2 hours
1 hour of heating from 50° C. to 125° C.
temperature of 125° C. maintained for 8 hours.

The beads obtained from the polymerization reaction were isolated by decanting, and dried to remove internal water.

Inventive Example 2

Inventive example 1 was repeated, but micropellets of Elastollan 1180A were used instead of Elastollan 1170AU. FIG. 1 shows the SEM of one of the polymers from inventive example 2 (40% by weight of polystyrene). $RuO_4$ was used for contrasting of the polystyrene phase with respect to the TPU phase.

Inventive Example 3

Production of TPU Polystyrene 40:60 Copolymer

Inventive example 1 was repeated with the following amounts of starting materials:

720 g of styrene, 5.1 g of dicumyl peroxide, and 480 g of Elastollan 1170AU

Inventive Example 4

Inventive example 2 was repeated. Micropellets of Elastollan 1180A were used instead of Elastollan 1170AU.

Inventive Example 5

Production of TPU Polystyrene 33:67 Solution Polymer 150 g of Elastollan 1170AU were dissolved in 750 g of dioxane in a 2 l HWS reactor, with thermometer, thermostat, reflux condenser, and blade stirrer. The solution was heated to 98° C., and then a solution of 12 g of dibenzoyl peroxide (75%) in 300 g of styrene was metered into the mixture over a period of 120 minutes. After a further 3.5 h at 98° C., the temperature was lowered to 95° C., and 6 g of dibenzoyl peroxide (75%) were metered into the mixture. The temperature was maintained for a further 3 h, and then the polymer was isolated via removal of the solvent (vacuum drying oven or rotary evaporator).

Inventive Example 6

Processing of the Polymers by the Injection-molding Process 17 g of the polymers from inventive examples 2 and 5 were mixed in a mini-extruder (DSM 15 cc microcompounder with conical twin-screw system) (temperature=190° C.; melt temperature=181° C.; rotation rate=80 rpm; mixing time=3 minutes) and directly processed in an injection-molding machine (10 cc micro-injection molding machine) to give tensile specimens (temperature of tensile-specimen mold: 40° C.; temperature of melt accumulator: 190° C.).

FIG. 2 shows the SEM of an injection molding from inventive example 3 (40% by weight of TPU, 60% by weight of polystyrene). $RuO_4$ was used for contrasting of the polystyrene phase with respect to the TPU phase.

Figure 3:
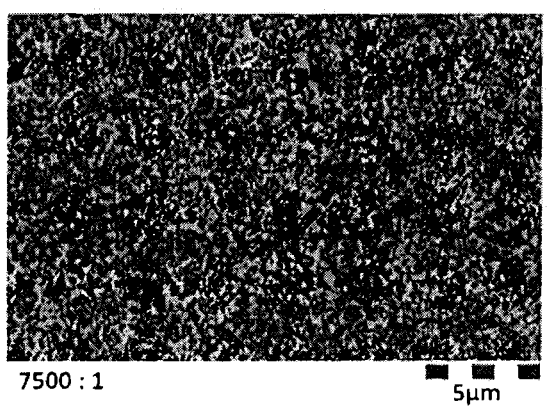
FIG. 3 shows the PS/TPU graft polymer 54:46 in accordance with inventive Example 5 after injection molding.

FIG. 3 shows PS/TPU graft polymer 54:46 in accordance with inventive example 5 after injection molding.

Comparative Example 1

Inventive example 6 was repeated, but 17 g of a mixture of polystyrene 158 K (Styrolution) and Elastollan 1170AU were charged to the extruder.

Figure 4:
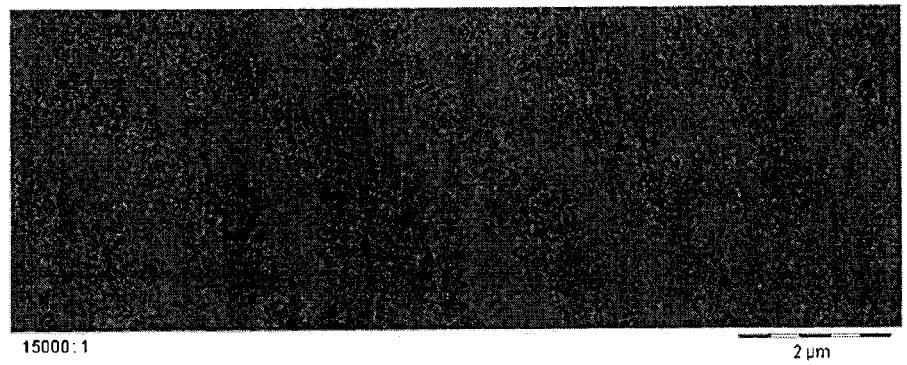
FIG. 4 shows the SEM of a blend (extrusion temperature 190° C.) of TPU (Elastollan® 1170A) and polystyrene in accordance with comparative Example 1.

FIG. 4 shows the SEM of a blend (extrusion temperature 190° C.) of TPU (Elastollan 1170AU) and polystyrene in accordance with comparative example 1. $RuO_4$ was used for contrasting of the polystyrene phase with respect to the TPU phase.

Figure 5:
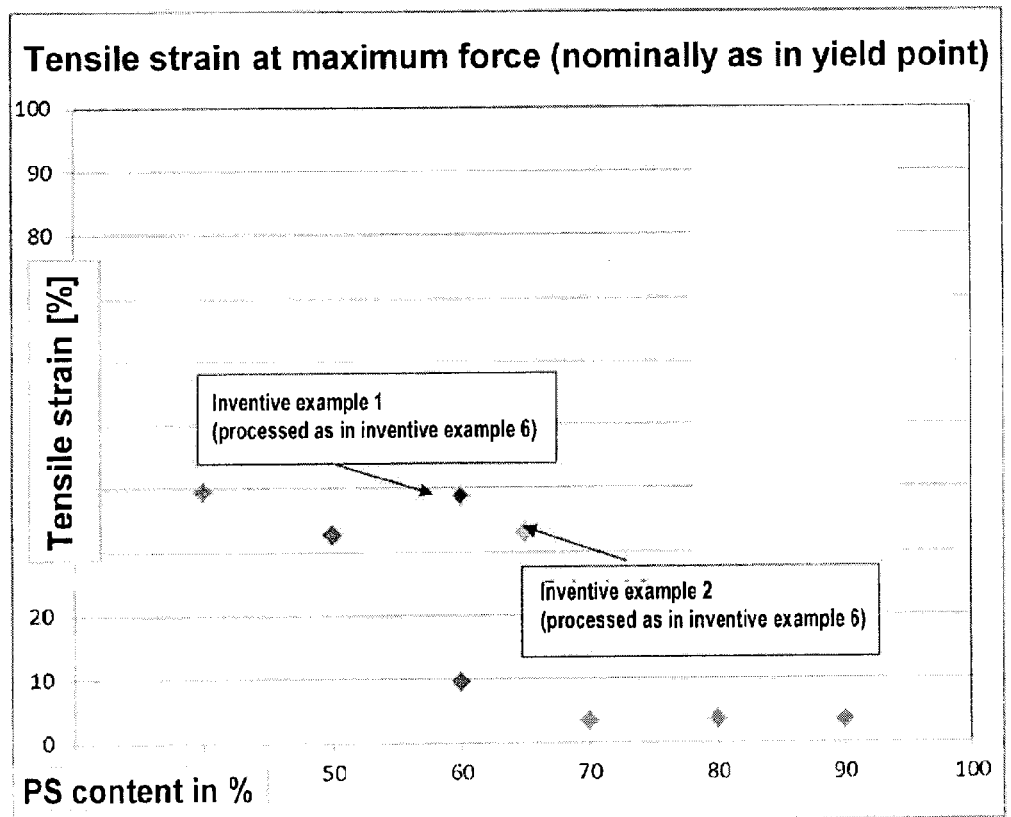
FIG. 5 shows percentage tensile strain at maximum force (measured in accordance with ISO 527-2) for various TPU blends plotted against polystyrene content.

Tensile strain at maximum force (measured in accordance with ISO 527-2) serves as an example of the high resilience of compositions of the invention:

The plot in FIG. 5 shows percentage tensile strain at maximum force (measured in accordance with ISO 527-2) for various TPU blends (♦ produced in accordance with comparative example 1), plotted against polystyrene content. The resilience of the materials is seen to decrease markedly at about 60% polystyrene content. In contrast, the materials from inventive example 1 and inventive example 2 (processed in accordance with inventive example 6) have high resilience in spite of high polystyrene content.

The invention claimed is:

1. A comb polymer comprising a thermoplastic polyurethane (TPU) component with a Vicat softening point, measured in accordance with ISO 306/A50, below 80° C., and from 5 to 95% by weight of at least one polymer component based on the entirety of the TPU component and of the polymer component, where the comb polymer is obtained via a free-radical polymerization of free-radically polymerizable monomers to form the polymer component in the presence of the TPU component, and wherein the TPU component comprises functional groups onto which the free-radically polymerizable monomers are bonded during the free-radical polymerization to form the comb polymer.

2. The comb polymer according to claim 1, where the polymer component comprises polymerized units of styrene.

3. The comb polymer according to claim 1, where the polymer component is polystyrene.

4. The comb polymer according to claim 1, where the Vicat softening point of the TPU component is in a range from 60 to 75° C.

5. The comb polymer according to claim 1, where a Shore hardness of the TPU component is in a range from 50 to 100, measured in accordance with DIN 53505.

6. The comb polymer according to claim 1, where a glass transition temperature of the TPU component is in a range from −20 to −60° C., measured in accordance with ISO 11357/-1/-2.

7. The comb polymer according to claim 1, where the TPU component comprises, in reacted form, at least one diisocyanate component selected from the group consisting of diphenylmethane 4,4'-diisocyanate, diphenylmethane 2,4'-diisocyanate, and diphenylmethane 2,2'-diisocyanate.

8. The comb polymer according to claim 1, where the TPU component comprises, in reacted form, diphenylmethane 4,4'-diisocyanate, one or more polytetrahydrofurans, and 1,4-butanediol.

9. The comb polymer according to claim 8, where the TPU component comprises at lease one of Polytetrahydrofuran 1000 and Polytetrahydrofuran 2000.

10. A process for producing a comb polymer, comprising:
a) dispersing one or more TPUs with a Vicat softening point below 80° C., from 5 to 95% by weight of one or more free-radically polymerizable monomers, based on the entirety of TPU and of the monomers mentioned, a polymerization initiator, a dispersing agent, and optionally other additional substances and/or polymerization aids, in an aqueous medium at a temperature at which no substantial polymerization of the free-radically polymerizable monomers takes place, wherein the TPU comprises functional groups,
b) optionally stirring the resultant dispersion for from one to 24 h at a temperature at which no substantial polymerization of the monomers takes place, and
c) polymerizing the free-radically polymerizable monomers with the functional groups of the TPU to form the comb polymer by free-radically polymerizing the free-radically polymerizable monomers onto functional groups of the TPU.

11. A process for producing a comb polymer, comprising:
a) dissolving one or more TPUs having a Vicat softening point below 80° C. and optionally other additional substances and/or polymerization aids, in a solvent, wherein the TPU comprises functional groups, which under conditions of a radical polymerization form a comb polymer structure, when radically polymerized with vinylically unsaturated monomers;
b) heating the solution to a polymerization temperature, and
c) introducing from 5 to 95% by weight of one or more vinylically unsaturated monomers to the heated solution, wherein the vinylically unsaturated monomers are polymerized with the functional groups of the TPU by a free-radical route, wherein % by weight is based on the entirety of TPU and of the vinylically unsaturated monomer(s), and one or more polymerization initiators.

12. The process according to claim 10, wherein the polymerization is carried out in the presence of a brominated organic and/or phosphorus-containing flame retardant and/or an organic peroxide.

13. The process according to claim 10, wherein the polymerization is carried out in the presence of a crosslinking agent.

14. The process according to claim 10, where the polymerization is carried out at a polymerization temperature of from 80 to 140° C.

15. The process according to claim 10, further comprising:
swelling the TPU in a solution comprising the vinylically unsaturated monomers, the polymerization initiator, and also optionally the auxiliaries and additional substances, below the polymerization temperature, and the polymerization temperature is above the temperature at which the swelling is carried out.

16. The process according to claim 15, where the polymerization takes place at from 110 to 140° C. and the swelling takes place at from 10 to 60° C.

17. The process according to claim 10, wherein an aqueous phase comprises a Pickering stabilizer in combination with a surfactant and/or a protective colloid.

18. A molding obtained via injection molding of the comb polymer according to claim 1.

19. A cable insulation, drag cable, pneumatic hose, spiral hose, toothed belt, conveying hose, or hydraulic hose comprising the molding according to claim 18.

20. The process according to claim 11, wherein the polymerization is carried out in the presence of a brominated organic and/or phosphorus-containing flame retardant and/or an organic peroxide.

21. The process according to claim 11, wherein the polymerization is carried out in the presence of a crosslinking agent.

22. The process according to claim 11, where the polymerization is carried out at a polymerization temperature of from 80 to 140° C.

23. A comb polymer, comprising:
- a thermoplastic polyurethane (TPU) with a Vicat softening point, measured in accordance with ISO 306/A50, below 80° C., and
- from 5 to 95% by weight of at least one polymer component based on the entire weight of the TPU and the polymer component,
- wherein the comb polymer is obtained via a free-radical polymerization of one or more vinylically unsaturated monomers in the presence of the TPU,
- wherein the polymer component comprises reacted units of the one or more vinylically unsaturated monomers and the polymer component is bonded to the TPU by functional groups on the TPU by the free-radical polymerization of the vinylically unsaturated monomers in the presence of the TPU, and
- wherein the TPU comprises, in reacted form, units of at least one diisocyanate selected from the group consisting of diphenylmethane 4,4'-diisocyanate, diphenylmethane 2,4'-diisocyanate and diphenylmethane 2,2'-diisocyanate.

* * * * *